(12) United States Patent
Clift et al.

(10) Patent No.: US 6,633,970 B1
(45) Date of Patent: Oct. 14, 2003

(54) PROCESSOR WITH REGISTERS STORING COMMITTED/SPECULATIVE DATA AND A RAT STATE HISTORY RECOVERY MECHANISM WITH RETIRE POINTER

(75) Inventors: David W. Clift, Hillsboro, OR (US); Darrell D. Boggs, Aloha, OR (US); David J. Sager, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/472,840

(22) Filed: Dec. 28, 1999

(51) Int. Cl.[7] ................................................. G06F 9/38
(52) U.S. Cl. ........................ 712/217; 712/23; 712/218
(58) Field of Search .......................... 712/23, 217, 218

(56) References Cited

U.S. PATENT DOCUMENTS

| | | | | |
|---|---|---|---|---|
| 4,901,233 A | * | 2/1990 | Liptay ........................ 712/218 |
| 5,197,132 A | | 3/1993 | Steely, Jr. et al. .......... 712/217 |
| 5,452,426 A | * | 9/1995 | Papworth et al. ........... 712/217 |
| 5,471,633 A | | 11/1995 | Colwell et al. ............... 712/23 |
| 5,499,352 A | | 3/1996 | Clift et al. .................. 712/217 |
| 5,519,841 A | | 5/1996 | Sager et al. ................. 711/202 |
| 5,613,132 A | | 3/1997 | Clift et al. .................. 712/217 |
| 5,675,759 A | * | 10/1997 | Shebanow et al. .......... 712/217 |
| 5,727,176 A | | 3/1998 | Clift et al. .................. 712/217 |
| 5,758,112 A | * | 5/1998 | Yeager et al. ............... 712/217 |
| 5,765,016 A | * | 6/1998 | Walker ........................ 712/23 |
| 5,944,810 A | * | 8/1999 | Cherabuddi .................. 712/23 |
| 5,974,524 A | * | 10/1999 | Cheong et al. ............... 712/23 |

* cited by examiner

Primary Examiner—Kenneth S. Kim

(57) ABSTRACT

A mechanism is provided for allowing a processor to recover from a failure of a predicted path of instructions (e.g., from a mispredicted branch or other event). The mechanism includes a plurality of physical registers, each physical register can store either architectural data or speculative data. The apparatus also includes a primary array to store a mapping from logical registers to physical registers, the primary array storing a speculative state of the processor. The apparatus also includes a buffer coupled to the primary array to store information identifying which physical registers store architectural data and which physical registers store speculative data. According to another embodiment, a history buffer is coupled to the secondary array and stores historical physical register to logical register mappings performed for each of a plurality of instructions part of a predicted path. The secondary array is movable to a particular speculative state based on the mappings stored in the history buffer, such as to a location where a path failure may occur. The secondary array can then be copied to the primary array when a failure is detected in a predicted path of instructions near where the secondary array is located to allow the processor to recover from the predicted path failure.

44 Claims, 8 Drawing Sheets

FIG. 6

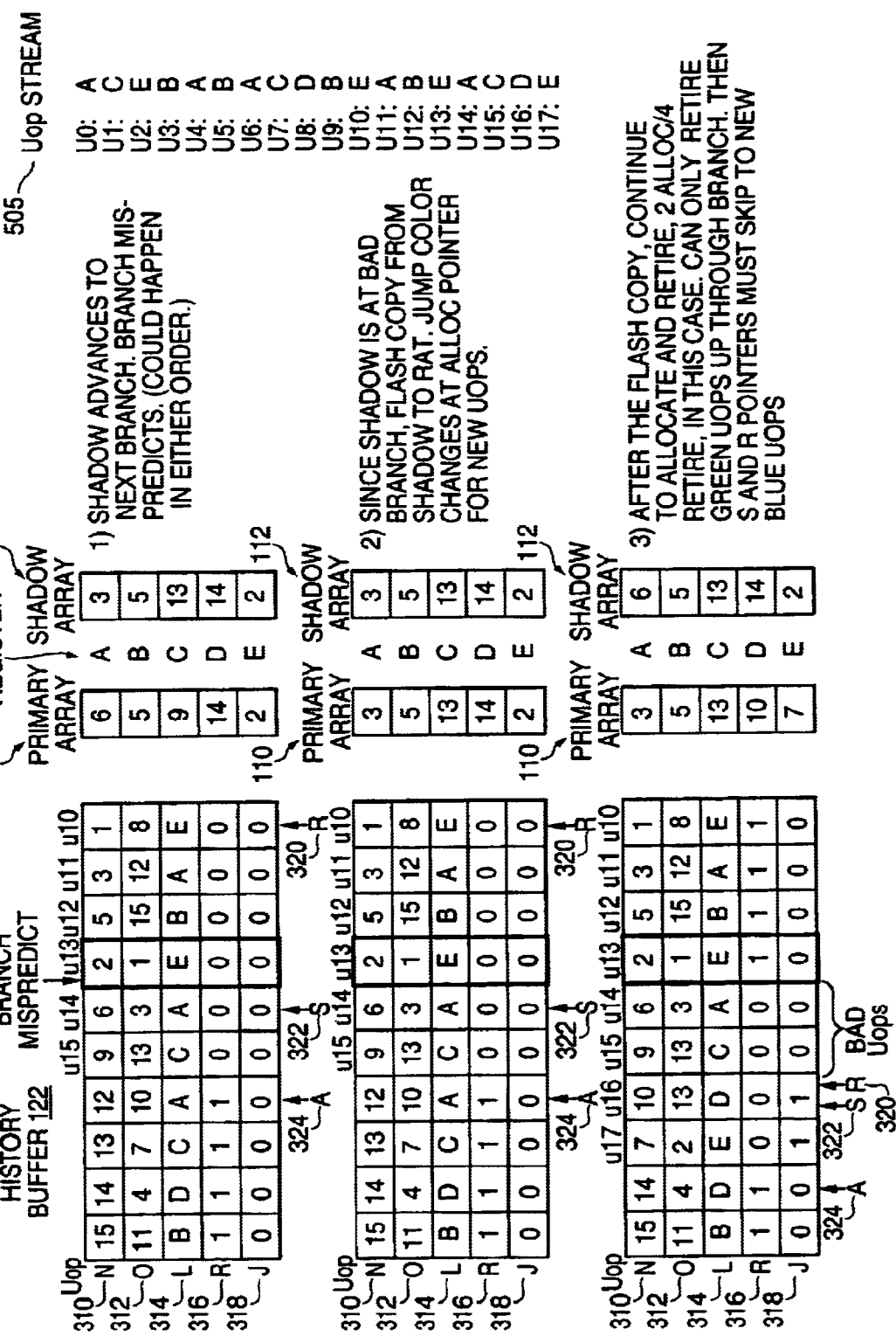

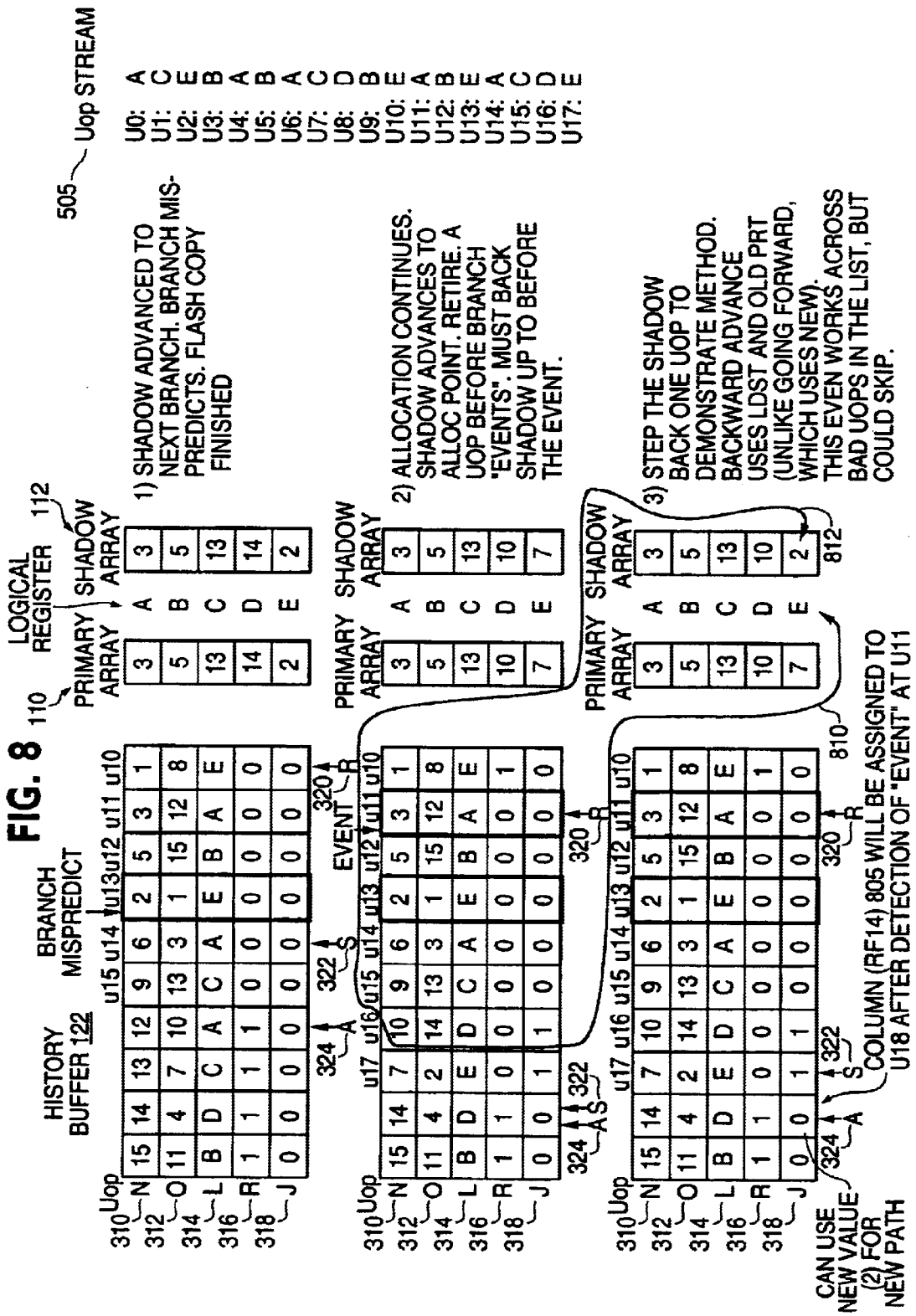

PROCESSOR WITH REGISTERS STORING COMMITTED/SPECULATIVE DATA AND A RAT STATE HISTORY RECOVERY MECHANISM WITH RETIRE POINTER

FIELD

The invention generally relates to processors, and in particular to RAT state history recovery mechanism.

BACKGROUND

In some current processors, instructions are decoded into one or more micro-operations (uops), and each uop is loaded into a re-order buffer (ROB) to await scheduling for execution. A register alias table (RAT) is provided for storing a mapping or aliasing between logical registers and physical registers. The physical registers include the real register file (RRF) for storing retired data, and include the ROB for storing temporary or unretired data. After a uop is executed, the execution result is temporarily stored in the ROB. Uops are retired (or committed to architectural state) in order by physically moving the execution result (data) from the ROB to the RRF, and updating a pointer in the RAT for the corresponding logical register. An example of this type of processor is described in U.S. Pat. No. 5,727,176. However, this configuration has limitations. As execution units and other portions of the processor increase in speed, it becomes more difficult to physically move the data at retirement from the ROB to the RRF. A better technique is needed to keep track of temporary and retired data in the processor.

U.S. Pat. No. 5,197,132 (the '132 patent) discloses a register mapping system having a log containing a sequential listing of registers that were changed in preceding cycles for post-branch recovery. A register map includes a predicted map and a backup map, with each map storing a mapping to the physical home of each logical register. Muxes are provided in the '132 patent for selecting between the two maps for use. However, this arrangement is cumbersome and requires significant silicon due to the muxing between the two maps, and because data output paths are connected to each map. Moreover, the mapping circuit in the '132 patent is inflexible as it requires the backup map to maintain a particular minimum distance (e.g., 20 clock cycles) behind the predictive map to allow the processor to confirm that the first instruction does not cause an event that requires the register map to be backed up to an earlier state using the backup map. Thus, the '132 patent discloses a restrictive and inflexible approach. As a result, there is a need for a more flexible and effective technique for keeping track of the temporary and permanent data in the processor.

SUMMARY

According to an embodiment of the present invention, an apparatus is provided for allowing a processor to recover from a failure of a predicted path of instructions. The apparatus includes a plurality of physical registers, each physical register to store either architectural data or speculative data. The apparatus also includes a primary array a primary array to store a speculative state of the processor including mappings from logical registers to physical registers. The apparatus also includes a buffer coupled to the primary array to store information identifying which physical registers store architectural data and which physical registers store speculative data.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The following represents brief descriptions of the drawings, wherein:

FIG. 6 is a diagram of a history buffer and a RAT primary array for three example steps according to an example embodiment of the present invention.

FIG. 7 is a diagram of a history buffer, a RAT primary array and a RAT shadow array for three more example steps according to an example embodiment of the present invention.

FIG. 8 is a diagram of a history buffer, a RAT primary array and a RAT shadow array for three additional example steps according to another example embodiment of the present invention.

DETAILED DESCRIPTION

Figure 1:
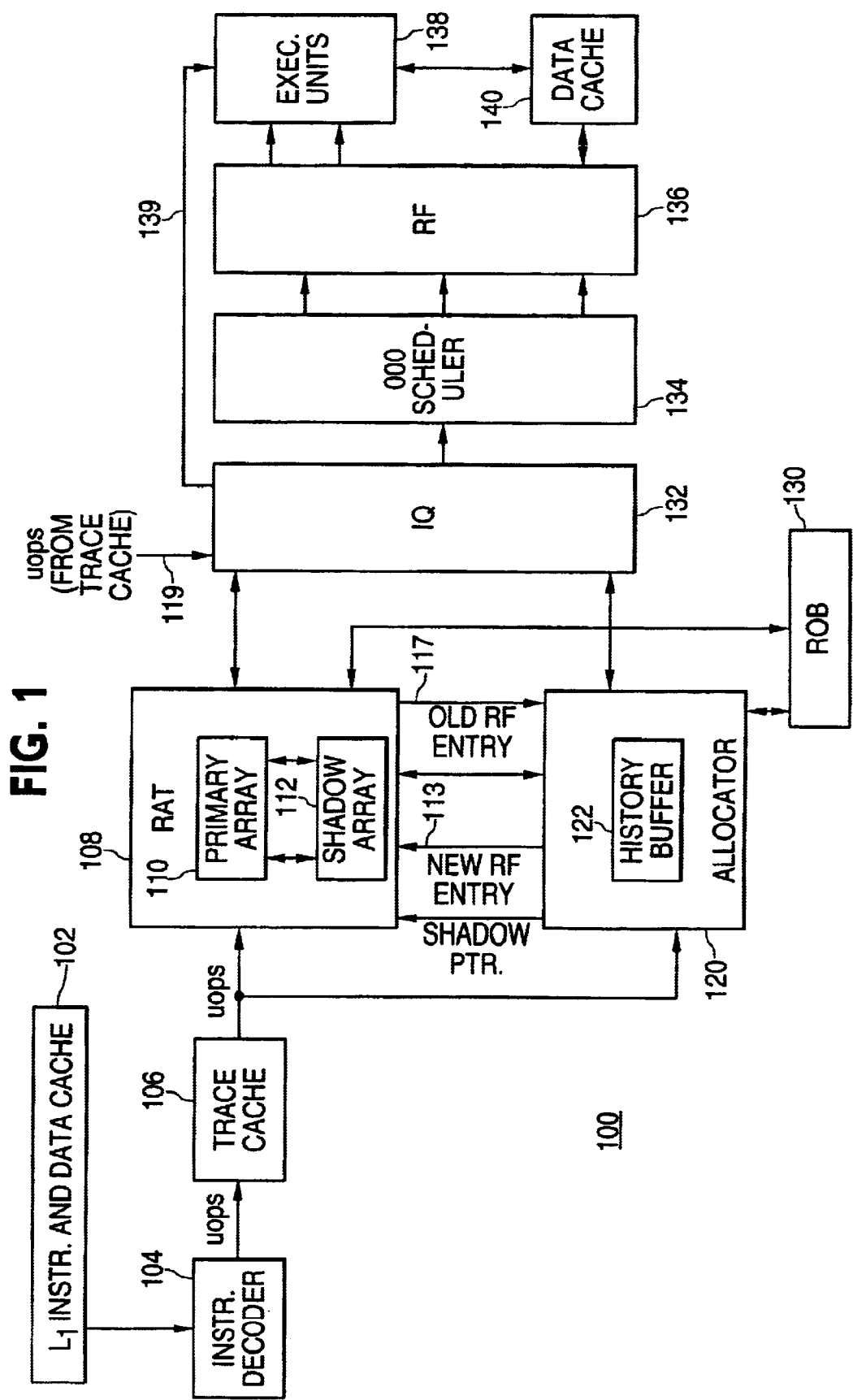
FIG. 1 is a block diagram illustrating a portion of a processor according to an embodiment of the present invention.

According to an embodiment of the invention, the processor described herein is a speculative machine. If a branch instruction is encountered, prediction logic in the processor predicts whether the branch will be taken. The branch prediction logic is thus used to determine a predicted path for speculatively fetching uops. Instructions are speculatively fetched from memory and decoded into one or more uops in order. The uops can then be executed out of order. According to an embodiment of the invention, uops can even be speculatively executed before their source data is available. The uops are then retired in order.

Rather than storing the temporary (unretired) data and the permanent (retired) data in separate locations or files, the temporary and permanent data are stored together (intermixed) in a single register file (RF). The register file (RF) is an array of physical registers or RF entries, which stores both temporary and permanent data. Thus, because the temporary and permanent data are both stored (intermixed) in a single register file, it is unnecessary to physically move the data at retirement, according to an embodiment of the invention.

A RAT primary array is provided that stores a mapping from the processor logical registers to physical registers (i.e., register file entries). The RAT primary array stores or reflects a current or working state of the processor. According to an embodiment of the invention, the primary array reflects a current and most speculative state of the processor. When a uop is decoded, an allocator allocates an available (or free) RF entry as a physical destination (Pdst) for the execution results of the uop. According to an embodiment, the RAT primary array is the only array that is used by the processor to identify the mappings from logical registers to physical registers (of the current state of the processor). According to an embodiment, the current state or most speculative state of the processor (which is reflected in the RAT primary array) is at the point of allocation (where an RF entry is allocated to the next uop or instruction).

According to an embodiment of the invention, a RAT shadow array and a history buffer are provided. The history buffer is an array that stores historical state information of the logical and physical registers that allows a uop to be done (performed) or undone(reversed), as reflected in the primary array. The successive mappings from logical registers to physical registers as allocated for each uop is recorded in the history buffer. The history buffer also includes a jump color path field to allow the processor to distinguish between good uops in the history buffer (uops which will be executed and retired) and bad uops which were prefetched and allocated but which will not be executed due to a failure of the predicted path (e.g., due to either a mispredicted branch or other event).

The RAT shadow array is a second copy of the RAT (the first copy being the primary array). Like the primary array, the shadow array includes a pointer or address to an RF entry (or physical register) corresponding to each logical register. The shadow array stores a processor RAT state (e.g., mappings from logical register to physical register) that allows the processor to recover from a mispredicted branch or other event (such as an interrupt). The shadow array can be moved forward or backwards to any position (or instruction) between allocation and retirement using the information stored in the history buffer.

As described above, the primary array is updated at allocation time. The shadow array can change states or locations (e.g., move forward or backwards) based on the information stored in the history buffer. The shadow array is moved forwards or backwards independently from the state or position of the primary array and independent of which uops have executed. The ability of the shadow array to move backwards allows the shadow array to be located anywhere, rather than be restricted to some minimum distance behind the primary array. If a branch instruction behind the location of the shadow array (i.e., earlier in the program order) mispredicts (creating a predicted path failure), the shadow array can be backed up sequentially until the shadow array reaches the point of path failure (i.e., to the last good uop or instruction). The shadow array can then be flash copied into the primary array to allow the primary array to quickly recover from the mispredicted branch. According to one example embodiment of the invention, the RAT attempts to keep the shadow array at the location of (or pointed to) the best estimate of the next mispredicted branch or event. If a path failure occurs (e.g., a mispredicted branch or an event is detected) near where the RAT shadow array is located, the RAT shadow array preferably is flash copied (e.g., all array entries copied in one clock cycle) into the RAT primary array, thereby quickly moving the RAT primary array back to the point (or state) near where the path failure occurred. Multiple RAT shadow arrays (e.g., each located at a different branch instruction) can also be used to recover from one of several anticipated mispredicted branches or events.

Architecture

Referring to the figures in which like numerals indicate like elements, FIG. 1 is a block diagram illustrating a portion of a processor according to an embodiment of the present invention. Specifically, the instruction pipeline is illustrated in FIG. 1. The processor illustrated in FIG. 1 is provided merely as an example embodiment, and the present invention is not limited thereto. Processor 100 includes an L1 instruction and data cache 102 for storing data and instructions, an instruction decoder 104 for decoding instructions into one or more micro-operations (or micro-ops or uops). As used herein, the terms instruction and uop (or operation) may be used interchangeably, and include instructions, operations, micro-ops, or other types of instructions or operations. A trace cache 106 is coupled to the instruction decoder 104 for storing decoded uops. If one or more uops are re-executed, the uops can be directly retrieved from the trace cache 104, thereby avoiding refetching the instructions from the cache (or memory) and decoding the instructions.

A Register Alias Table (RAT) 108 and an allocator 120 each receive uops from trace cache 106. RAT 108 translates logical register names (logical source or Lsrc and logical destination or Ldst) into physical register addresses (physical source or Psrc and physical destination or Pdst). The RAT 108 also includes two arrays for storing a mapping from logical register to physical register: a primary array 110 stores the current (and most speculative) state, while a shadow array 112 stores a previous state that may be used to allow a quick and efficient recovery from a mispredicted branch or other event (such as an interrupt or trap). According to an example embodiment of the invention, the shadow array 112 can be located or pointed to the best estimate of the next mispredicted branch. The shadow array 112 can be pointed to a variety of different states of the processor. The physical registers are shown in FIG. 1 as the register file (RF) 136.

The allocator 120 allocates resources for each uop, and includes a history buffer 122 for storing past or historical logical register to physical register mappings and other information. The history buffer 122 allows the previous uops to be done or undone, and allows the shadow array 112 to be created using these historical mappings (from logical registers to physical registers) and other information stored in the history buffer 122. According to an embodiment of the present invention, the register file (RF) 136 stores or intermixes both temporary data and permanent (or retired) data. Because one register file is used to physically store temporary and retired data, it is therefore unnecessary to physically move the data at retirement, and processor speed can be accordingly improved. As a result, to keep track of which data in RF 136 is temporary, which data is retired, etc., the history buffer 122 includes a number of fields and pointers to keep track of the various states of data.

The processor 100 includes a re-order buffer (or ROB) 130 which determines when a uop has properly completed execution and retired. An instruction queue (IQ) 132 is connected to the RAT and allocator 120 for storing uops awaiting to be scheduled for execution. An out-of-order (OOO) scheduler 134 schedules uops in the IQ 132 for execution. Register file 136 is connected to scheduler 134 and includes an array of physical registers (or RF entries) for storing data. The execution units 138 are connected to the RF 136 and the scheduler 134 for executing uops. Each uop includes two sources (i.e., one or more sources) and a destination (as an example). The execution units 138 receive the uop from the IQ 132 and scheduler 134. A data cache 140 is provided for storing memory data.

The RAT Primary Array and the Register File

Figure 2:
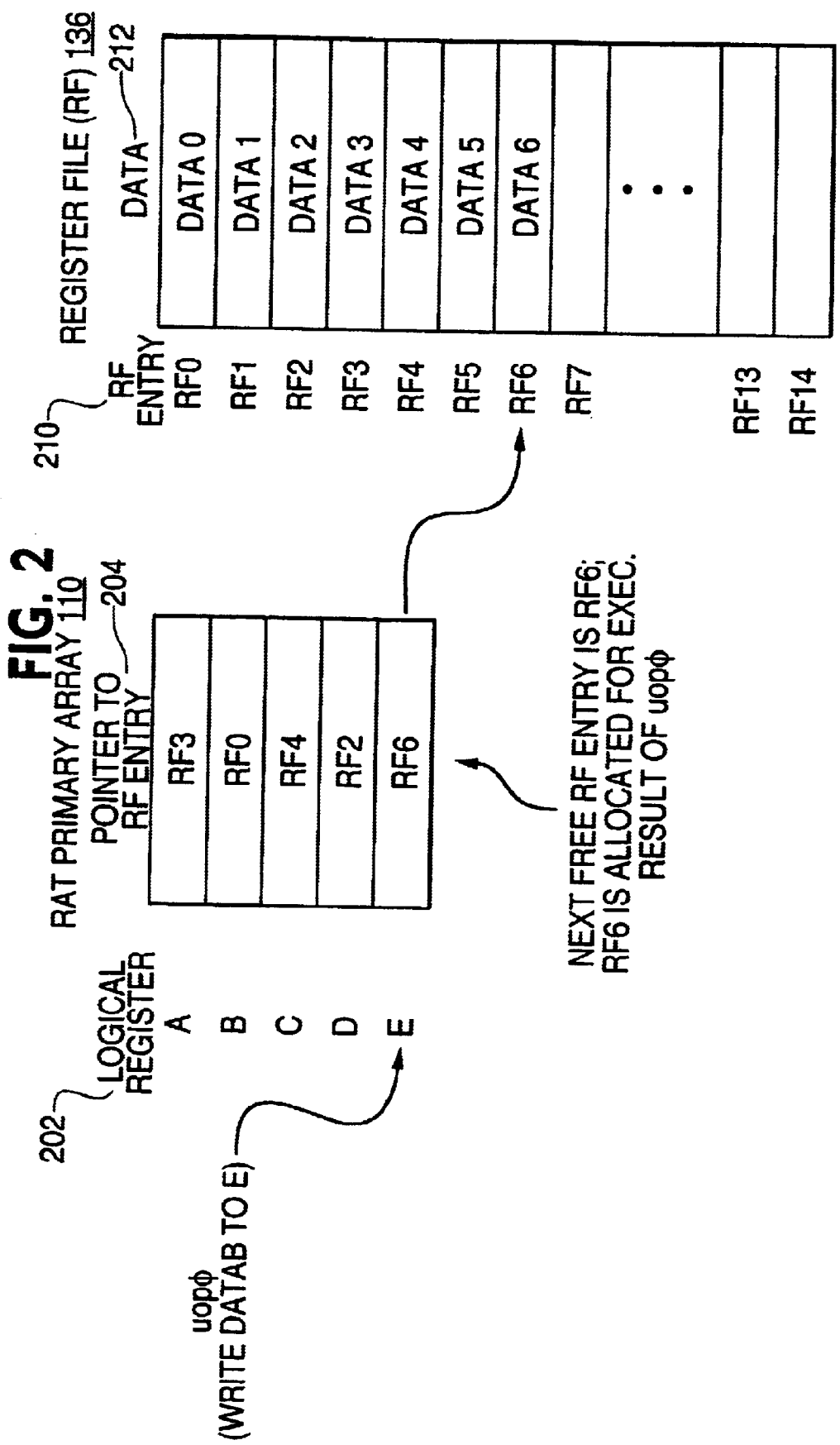
FIG. 2 is a diagram illustrating a RAT primary array and a register file (RF) according to example embodiments of the present invention.

FIG. 2 is a diagram illustrating a RAT primary array and a register file (RF) according to example embodiments of the present invention. In this example of FIG. 2, there are five logical registers A, B, C, D and E, and there are 15 RF entries (or physical registers) in the register file (RF) 136. These numbers are selected merely as examples. There could be almost any number of logical registers and RF entries (physical registers), so long as there is at least one physical register for every logical register. Register file (RF) 136 contains an array of the physical registers or RF entries. The RF 136 stores (or intermixes) both temporary (i.e., unretired) data and retired data.

FIG. 2 includes a column 202 identifying the logical register (i.e., either logical register A, B, C, D or E). The RAT primary array 110 includes a column 204 that includes pointers to RF entries of register file (RF) 136 to identify which RF entries have been mapped to the logical registers identified by column 202. In this example, the primary array 110 includes a pointer to RF3 (pointer to entry 3 of the RF 136) for logical register A, a pointer to RF0 for logical register B, a pointer to RF4 for logical register C, a pointer to RF2 for logical register D and a pointer to RF6 for logical register E. Thus, primary array 110 identifies the current (most speculative) state, and identifies, in this example, that data for logical register A is physically stored in RF3, the data for logical register B is stored in RF0, the data for logical register C is stored in RF4, etc.

FIG. 2 also illustrates an example embodiment of the register file (RF) 136. RF 136 in this example embodiment includes 15 entries (or physical registers). A column 210 identifies each RF entry(or physical register) for the register file 136. The register file 136 includes a data column 212 that stores the data for each of the RF entries. As noted above, for each logical register (in this example logical registers A–E of array 110), the primary array 110 includes a pointer to a physical register or RF entry where the data for that logical register is physically stored, or where the execution results will be stored after execution of the uop.

For example, as illustrated in FIG. 2, uop0 performs a write of data6 to logical register E. The allocator 120 (FIG. 1) selects (or allocates) RF6 as the next available physical register (i.e., entry in RF 136) for the uop (i.e., for storing the execution result of the uop). In this example shown in FIG. 2, RAT 108 updates the primary array 110 by storing the pointer to RF6 for logical register E. After updating the RAT primary array 110, array 110 indicates that the data for logical register E is presently stored (or will be stored after execution) in RF entry RF6. After this uop executes, the execution result (i.e., data6) is stored in RF6 as shown in FIG. 2.

Overall Operation in Instruction Pipeline

Referring to FIGS. 1 and 2, the overall operation of the processor 100 will be briefly discussed according to an example embodiment of the invention. Complex instructions are received from the cache 102 and decoded into one or more micro-ops or uops by the instruction decoder 104. The uops are stored in the trace cache 106. As output from the trace cache 106, each uop includes an operation-code (op-code), one or more source operands (or logical sources or Lsrcs) and one destination operand (logical destination or Ldst), for example. The logical sources (Lsrcs) and logical destination(Ldst) may refer to the logical registers A–E, but do not refer to the physical registers (RF entries). The trace cache 106 provides one or more uops per clock cycle to both the RAT 108 and to the allocator 120.

The allocator 120 receives at least the op-code of each uop and determines what kind of resources are needed to execute the uop. The allocator 120 then allocates resources for the uop, including allocating the next free or available RF entry (or Pdst) in RF 136 for the uop (i.e., for storing the execution result of the uop). This point in the pipeline can be referred to as allocation time. The allocator 120 then provides the address or pointer to this new RF entry (the physical destination or Pdst) for this uop to the IQ 132 and the RAT 108. The pointer to the new RF entry (Pdst) for this uop is provided to the RAT via line 113, for example.

The RAT 108 receives at least the two logical sources (Lsrcs) and the logical destination (Ldst) of the uop from the trace cache 106 and identifies the current physical registers (i.e., physical sources and physical destination) corresponding to the logical sources (Lsrcs) and the logical destination (Ldst) for the uop using the RAT primary array 110. RAT 108 can identify a corresponding physical register (RF entry) by identifying the RF pointer in column 204 of primary array 110 for each logical register (Lsrc or Ldst). RAT 108 provides at least the RF pointers to the physical sources (Psrcs) of the uop to the IQ 132. Thus, as an example, the IQ 132 receives the op-code of the uop from trace cache 106 via line 119, receives a pointer or address to the physical destination (Pdst) for the uop (i.e., for storing the execution result of the uop) from the allocator 120, and receives pointers or addresses to the two physical sources (Psrcs) for the uop from RAT 108. As a result, the IQ 132 receives substantially the same uop as stored in trace cache 106, but receives the physical source and physical destination pointers or addresses rather than the logical addresses.

RAT 108 also receives the address of (or pointer to) the new physical destination (Pdst) for the uop (corresponding to the Ldst) from allocator 120 via line 113. RAT 108 updates the primary array 110 to store the pointer to the new physical destination (Pdst) for the uop corresponding to the logical register (the Ldst). For example, if a uop designates logical register A as the logical destination, and allocator120 allocates RF12 (e.g., as the next available RF entry) as the physical destination (Pdst) for the uop, RAT 108 updates the pointer in column 204 (FIG. 2) for logical register A in primary array 110 to point to RF12.

However, before updating the primary array 110 to identify the new physical register (Pdst) corresponding to the logical register A for the uop, RAT 108 reads out from primary array 110 and stores the pointer to the old physical register or RF entry (Pdst) corresponding to the logical register A. (Register A is again, used only as an example). This pointer to the old physical destination (RF entry) for register A is provided from the RAT 108 to the allocator 120 via line 117 and is used by the allocator 120 to create a new entry in the history buffer 122. The history buffer 122 is described in greater detail below.

The uop stored in the IQ 132, including an op-code, physical source addresses or pointers and a physical destination address or pointer, is provided to the scheduler 134 for scheduling for execution. At the appropriate time, the op-code is provided via line 139 to the execution units 138, and source data may be provided from the physical registers from the RF 136 to execution units 138 as identified by the physical sources of the uop. The scheduler 134 also provides the pointer to the physical destination for the uop (for storing execution results) to the RF 136 and to the execution units 138. The execution units 138 (e.g., one of the execution units) execute the uop and stores the execution result in the physical register (i.e., RF entry) designated by the uop. In the above example, if RF12 was allocated by allocator 120 for the uop, the execution result for the uop would then be physically stored in RF12. RAT primary array 110 stores the mapping from logical register A to the physical register RF12 (where the data for register A is physically stored).

If the next uop also writes to logical register A, a similar procedure would be followed. Allocator 120 allocates the next available RF entry for the uop and provides a pointer to this RF entry to the RAT 108 via line 113. The RAT 108 reads the old pointer (old RF entry) from column 204 of array 110 for logical register A (i.e., RF12), and provides this old RF entry to the allocator 120 via line 117 for creating another entry in the history buffer 122 (recording both the old and new RF entries and logical register for the uop). RAT 108 then stores the RF entry for the logical register in column 204 of the RAT primary array 110. The history buffer 122 stores information that allows the uop to be done or undone.

History Buffer

Figure 3:
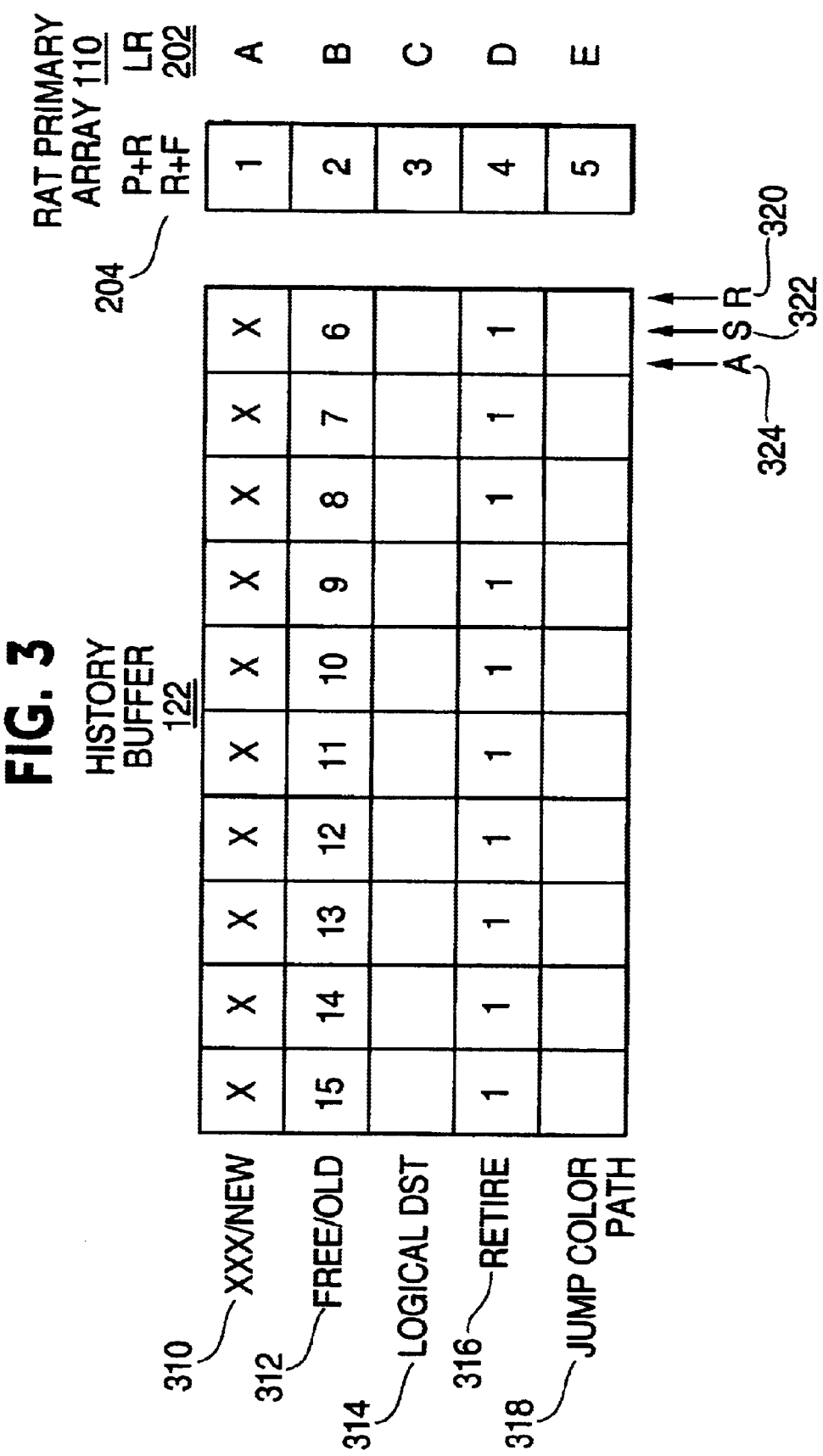
FIG. 3 is a diagram of a history buffer according to an example embodiment of the present invention.

FIG. 3 is a diagram of a history buffer according to an example embodiment of the present invention. History buffer 122 is an array that stores historical state information of the logical and physical registers that allows a uop to be done (performed) or undone(reversed), as reflected in the primary array. In other words, the history buffer 122 allows the effects of each uop as seen by the logical registers to be done (performed) or undone (reversed). The successive mappings from logical registers to physical registers as allocated by allocator 120 and mapped by RAT 108 for each uop is recorded in the history buffer 122, and thus, the effects to the logical registers resulting from each uop can be performed or reversed, step by step (i.e., one uop at a time) using information stored in the history buffer 122.

Referring to FIG. 3, an example history buffer 122 is shown, and includes information for 10 RF entries. In this example, there are 5 renameable logical registers A–E as well as 15 RF entries or physical registers (i.e., RF1–RF15) in the register file (RF) 136 (RF 136 is not shown in FIG. 3). The minimum size of the history buffer 122 is determined as:

Minimum size of history buffer 122=no. of physical registers–no. of logical registers. This size allows the state information for all RF entries (physical registers) to be tracked. The history buffer 122 can be larger.

The various fields and pointers in the history buffer 122 (described in detail below) allow the processor to keep track of the various data and states. Each pointer in the history buffer may be, for example, a 7-bit value that indexes or points to a particular entry in the history buffer 122. Each pointer in the history buffer 122 is readable and writeable such that each pointer can be cleared or set to any value.

Referring to the history buffer 122 of FIG. 3, each column includes an XXX/new field 310, a Free/Old field 312, a logical destination field 314, a retire field 316 and a jump color path field 318 (also known as the path field). The logical destination field 314 identifies the logical destination for the uop (e.g., either register A, B, C, D or E). The XXX/New field 310 identifies the new RF entry for the logical register. X is used in field 310 if no new RF entry has been assigned yet to the logical register. The free/old field 312 is a list of free (or available) RF entries (if unallocated) or identifies the old RF entry (previous RF entry) if allocated and not yet retired. The Retire field 316 is a 1 if the uop has been executed and retired, thereby making the old RF entry free to be reallocated for a new uop. If the retire field 316 is a 1, the corresponding free/old field 312 indicates a "free" (or available) RF entry. If the retire field 316 is a 0 (meaning the uop and old RF entry are not yet retired), then XXX/New field 310 will refer to a new RF entry (a new Pdst) and the free/old field 312 will refer to an old RF entry (an old Pdst) because the old RF entry is not yet free (available). The jump color path field 318 of history buffer 122 is described below.

When a uop is retired, it is no longer necessary to store the state information associated with that uop because there are usually no circumstances in which one would want to back up the processor to the state just prior to that uop (and, thus, the historical information stored in the history buffer 122 for this uop can be deleted). Therefore, the old RF entry 312 (FIG. 3) for the retired uop (i.e., the previous or old physical register used to store the execution results) is made available (i.e., de-allocated) to be reallocated as a Pdst for a new uop. Thus, in this manner, when a uop properly completes execution and is retired, the ROB 130 (FIG. 1) notifies the allocator 120 that the uop has been retired. The allocator 120 then sets the corresponding Retire bit (or field) 316 in the history buffer 122 to a 1 and moves a retirement pointer (R) 320 past the corresponding column to indicate that the uop and its associated new RF entry 310 (Pdst) have been retired and the old RF entry 312 (corresponding to the same logical register) is now available or free to be reallocated as the Pdst for a new uop.

History buffer 122 also includes three pointers, including an allocation pointer (A pointer) 324, a shadow pointer (an S pointer) 322 and a retirement pointer (R pointer) 320. All three pointers typically move right to left (although the shadow pointer 322 can move either direction depending on whether the shadow array 112 is moving forward or backward). Allocation pointer 324 points to the next free (or available) RF entry that will (usually) be allocated for the next uop (i.e., allocated as the Pdst for storing the execution results of the next uop). Thus, in general, the Free/old RF entries on and to the left of the allocation pointer 324 are Free (unallocated), while Free/old RF entries to the right of the allocation pointer 324 are old or allocated and may or may not be retired yet.

The retirement pointer 320 (FIG. 3) points to the next RF entry that will be retired. Old RF entries to the left of the retirement pointer 320 and having a 0 in the retire field 316 are allocated (in use) and are not yet retired. Old RF entries to the right of the retirement pointer 320 having a 1 in the retire field 316 have been retired. Old RF entries to the right of the retirement pointer 320 which have a 0 in the Retire field 316 were not retired and will not be retired (usually because these uops were part of a Mispredicted path that should not be retired or committed to architectural state). The shadow pointer 322 points to the next new RF entry that will be updated in the shadow array, as described in greater detail below.

As noted in the Background above, some past systems have physically stored temporary or speculative data (unretired uop execution results) in one array (such as a ROB) and the retired data (indicating the architectural state of the processor) in a physically separate array (e.g., a Real Register File). According to such a prior technique, when the execution results or temporary data was retired, the data was physically moved or copied from the first array (or ROB) into the second array (or RRF). As processors increase in speed, however, it becomes more difficult to physically move the data at retirement from the ROB to the RRF.

In contrast to this previous technique, the present invention intermixes both temporary or speculative (i.e., unretired) data and retired data (indicating the architectural state of the processor) in a single register file (RF) 136. As noted above, when a uop is retired, the Retire field 316 for the uop is set to a 1 and the retirement pointer 320 is incremented to the next uop. Thus, the most recently retired data for each logical register indicates the current architectural state of the processor. As noted, the history buffer 122 Old RF entries to the right of the retirement pointer 320 having a 1 in the retire field 316 have been retired, and are considered architectural data. The remaining RF entries which have been allocated may also store temporary or unretired data (execution results) which is speculative data (speculative because it has not yet been retired or committed to architectural state, and it is uncertain whether this temporary data will be retired). Therefore, the use of a single data array to store both unretired (or speculative) data and retired (or architectural state) data allows a much simpler and faster technique to be used to effect retirement because only a retirement pointer 320 and a Retire flag 316 are updated at retirement (rather than physically moving the data between data arrays).

Jump Color Path Field of the History Buffer

The purpose of the jump color path field 318 in the history buffer 122 will now be briefly described. The jump color path field 318 (or path field 318) is used to allow the processor 100 to distinguish between good uops (uops which will be executed and retired) and bad uops which were prefetched and will not be executed due to a failure of the predicted path—due to either a mispredicted branch or other event.

The processor 100 speculatively prefetches instructions and decodes them into uops for execution. To improve performance, branch prediction logic is provided to make more intelligent decisions regarding what information to prefetch from memory. Whenever a branch uop enters the instruction pipeline, the prediction logic predicts whether the branch will be taken, and instructions from the predicted path are prefetched and decoded for execution. Uops are fetched and decoded in program,order, and may execute out of order. If a branch was mispredicted, all uops prefetched after the mispredicted branch are bad or incorrect uops and must be flushed from the pipeline, and the processor begins prefetching from the correct path. However, because uops can execute out of order (i.e., in an order that is different from the order which the uops were fetched and decoded), several uops may have been fetched, and RF entries allocated for each uop before a previous mispredicted branch is detected. Because, for example, an RF entry (Pdst) was already allocated for each of these (bad) uops when the mispredicted branch was detected, the processor needs a technique to distinguish bad uops (or the RF entries in the history buffer 122 allocated to bad uops) from the good uops in the history buffer 122. The bad uops will not be retired, thus, should not be reflected in the history buffer 122 as either a current most speculative state or an earlier state of the processor. Thus, the shadow pointer 322 and retirement pointer 320, after stepping to the mispredicted branch will need to skip over any bad uops (the RF entries allocated for bad uops in array 110) up to the uops (or their allocated RF entries in the history buffer 122) of correct path. The jump color path field 318 allows the processor to distinguish between RF entries for good uops (the correct path) and RF entries for bad uops (the mispredicted path).

The jump color path field (or "path") identifies micro-ops that correspond to a particular path. A new "path" is created after each mispredicted branch (or other event). According to an embodiment of the invention, the path field 318 (jump color path 318) allows a processor to distinguish between bad uops (allocated RF entries) corresponding to a mispredicted (or incorrect) path (RF entries allocated before detection of the mispredicted branch) and subsequent good uops corresponding to the new correct path that were decoded and RF entries allocated after detection of the mispredicted branch. After the shadow and retirement pointers step to the mispredicted branch, the shadow and retirement pointers should skip the bad uops in the primary array 110 up to the first good uop (after the mispredicted branch). This is indicated by the first uop (or old RF entry in array 110) after the mispredicted branch in which the jump color path field 318 changes.

At allocation time for each of the new (correct path) uops, the allocator 120 allocates an available RF entry for the Pdst for the uop, and the primary array 110 and the history buffer 122 are updated as usual. However, in the history buffer 122, the jump color path field 318 will be changed to a new or different value for the new correct uops as compared to the old uops. A new "path" is created each time an event or mispredicted branch is detected. This new path is established or indicated in the history buffer 122 by using a different value for the jump color path field 318 in history buffer 122. For example, a first path can be referred to as the "blue" path, while a second (correct) path (after an event or mispredicted branch is detected) may be a "green" path, with a different value used in path field 318 for the green path as compared to the value used for the blue path.

According to an embodiment of the invention, the new path (i.e., the use of a different value for the jump color path field 318) is started beginning at the location or entry in history buffer 122 where the allocation pointer (A) 324 is pointing when the event or the mispredicted branch is detected. One or more RF entries for (bad) uops subsequent to the mispredicted branch may have already been allocated before the mispredicted branch or event was detected. The jump color path field allows the shadow pointer 322 and the retirement pointer 320 to skip over these bad entries in the history buffer 122 (since the current speculative state or past state of the processor should not reflect these bad uops which will never be retired). Thus, according to an embodiment of the invention, the uops in buffer 122 after the event or mispredicted branch which are part of the same path (i.e., same value in path field 318) as the mispredicted branch are bad, and should be skipped.

According to an embodiment of the present invention, a uop may traverse two separate and distinct functional pipelines (distinct from the instruction pipeline described above), including an allocation (or primary) pipeline, and a shadow pipeline. These "pipelines" are not strict definitions, but merely provide a way to view the groups of steps or functions performed on a uop or instruction.

The allocation pipeline may refer to the steps performed relating to allocation of a uop, including allocation of a new RF entry for a uop, updating the primary array 110 based on the new allocation information. The allocation pipeline also includes reading out of the old RF entry from the primary array, updating of the history buffer 122 when a new RF entry is allocated based on the allocation information (e.g., the logical register, the old RF entry and the newly allocated RF entry). Additional steps, which may be considered as a "retirement pipeline" include steps of updating the history buffer 122 when an old RF entry is retired (e.g., de-allocating a RF entry by setting the Retire bit 316 and moving the retirement pointer 320 to make the old RF entry available to be allocated to a new uop).

The shadow pipeline includes the steps of appropriately updating the shadow array 112 based on the history buffer 122, for example, to be as close as possible to the next branch uop (or to point to the best estimate of the next mispredicted branch or event). Because the RAT 108 uses information in the history buffer 122 to update the shadow array 112, the shadow array 112 can be updated asynchronously as compared to the updating of the primary array 110 (i.e., without regard to the state or timing of the primary array). Thus, the shadow array 112 and the primary array 110 are substantially decoupled or independent from each other. The primary array 110 and the shadow array 112 functionally interconnect only when a flash copy is made from the shadow array 112 to the primary array 110 in response to detection of a failure in the predicted path, such as detection of a mispredicted branch or detection of an event.

RAT Shadow Array

Figure 4:
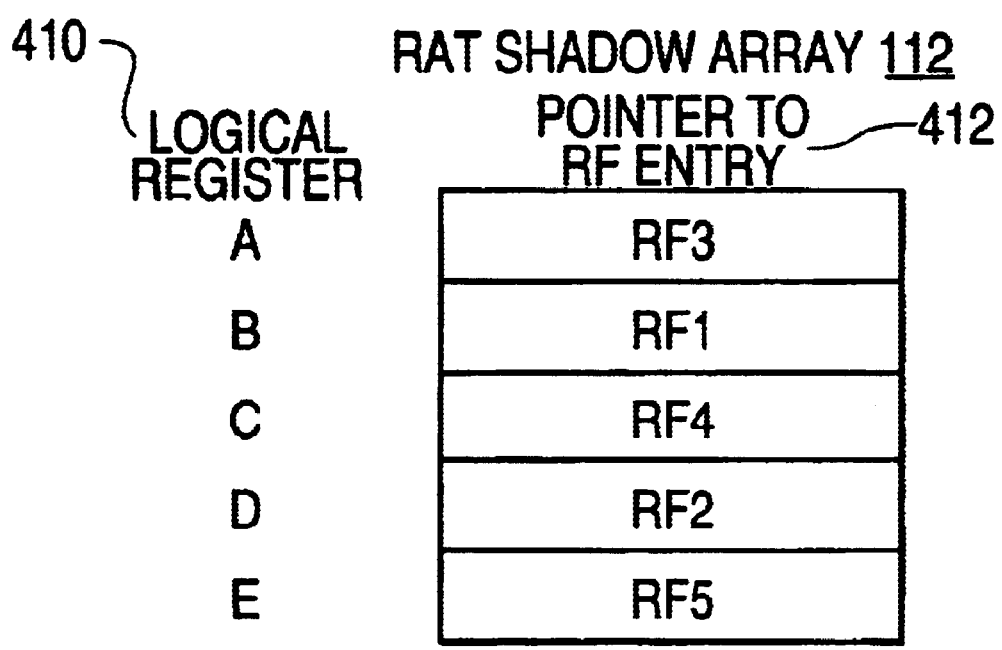
FIG. 4 is a diagram illustrating a RAT shadow array according to an example embodiment of the invention.

FIG. 4 is a diagram illustrating a RAT shadow array according to an example embodiment of the invention. The RAT shadow array 112 is a second copy of the RAT (the first copy being the primary array 110), and has a structure that is similar to the primary array 110. Shadow array 112 includes a pointer 412 or address to an RF entry (or physical register) corresponding to each logical register 410. The shadow Array 112 stores a processor RAT state (e.g., mappings from logical register to physical register) that allows the processor to recover from a mispredicted branch or other event (such as an interrupt). As shown in the example shadow array 112 illustrated in FIG. 4, the logical register A is mapped to RF3, logical register B is mapped to RF1, logical register C is mapped to RF4, etc.

The motivation or reason for providing a shadow (or secondary) array will be briefly described. According to an embodiment of the invention, the RAT primary array 110 reflects the current and most speculative state of the processor. As described above, at allocation time (i.e., when resources are allocated for a uop, including allocating an RF entry as the Pdst for the uop), the RAT primary array 110 is updated to reflect this new speculative state for the logical registers. In other words, at allocation time, the logical to physical register mappings in RAT primary array 110 are updated to reflect the allocation of a new RF entry to a uop, where the RF entry is assigned as the physical destination (Pdst) for the logical destination (Ldst) of the uop. Thus, at allocation time, the RAT primary array is updated to reflect this new mapping from logical register to physical register. However, as described above, the state stored in the primary array is "speculative." An event or a mispredicted branch may cause the predicted path to fail (i.e., where one or more prefetched instructions will be bad and will not be retired) which may also cause the speculative state stored in the RAT primary array 110 to be inaccurate or incorrect.

For example, when a mispredicted branch is detected, the instruction pipeline is flushed and uops after the mispredicted branch along a correct path are fetched and decoded for execution. When the mispredicted branch is detected, the RAT primary array 110 may contain a speculative state (i.e., register mappings) that is many uops ahead (in program order) of the mispredicted branch. In order to correct the information (or state) stored in the primary array 110, the state of the RAT primary array 110 should be backed up to the state just after allocation of the RF entry for the mispredicted branch (since just after the branch is where the new correct path uops will begin fetching and executing). Fortunately, according to an embodiment of the invention, the history buffer 122 stores the information necessary to undo or reverse the logical register to physical register mappings performed for each uop. Thus, according to an embodiment of the invention, the RAT 108 and the allocator 120 can use the information stored in history buffer 122 to step the RAT primary array 110 back one or more uops per clock cycle until the primary array reaches the state at or just after the mispredicted branch or event. The RAT primary array 110 can be stepped back one uop by replacing the pointer 204 in primary array 110 for a logical register with the pointer to the old RF entry (field 312 in history buffer 122). This moves the RAT primary array 110 one uop back.

However, the primary array 110 may be many uops ahead of the execution units, and may be even 50 or 100 uops ahead, for example. As such, the time penalty or price for a mispredicted branch could be very expensive and severe, e.g., up to 50 or 100 clock cycles. This is a high price (i.e., large time delay) to pay for each mispredicted branch or event, and can significantly degrade processor performance. Therefore, according to an embodiment of the present invention, a second copy of the RAT is maintained as the RAT shadow array 112 (with the first copy of the RAT being the RAT primary array 110) to allow the RAT primary array 110 to recover more quickly from an event or mispredicted branch.

According to an embodiment, both the primary array 110 and the shadow array 112 may step forward one or more uops at a time. As described above, the primary array 110 is updated at allocation time. The shadow array is updated (or changed) asynchronously (e.g., independent and decoupled from the primary array 110) based on the information stored in the history buffer 122. Thus, the shadow array 112 may be one or two cycles behind the primary array 110, for example, but there are no restrictive requirements on where the shadow must be located. For example, the shadow array may be located anywhere between allocation and retirement. In this example, the shadow array 112 continues following the primary array 110, stepping ahead one or more uops at a time, until the shadow array reaches an estimate of the next mispredicted branch or event (as an example location). The shadow array 112 may stop, for example, just before, on, or just after the estimated next mispredicted branch or event. The RAT shadow array 112 is maintained at this best estimate of the next mispredicted branch or event until it is determined whether or not the execution of the uop or branch near where the shadow array is located resulted in a failure of the subsequent path. For example, the shadow array waits at the best estimate of the next mispredicted branch until it is determined whether or not the branch was correctly predicted. Thus, the shadow will probably wait until the branch or uop executes, but will not have to wait for the uop or branch instruction to be retired. If the branch instruction near where the shadow array is located was correctly predicted (or the uop does not generate an event), no path failure results at that point and the shadow array 112 would then resume sequentially stepping forward (e.g., one or more uops per clock cycle) using information in the history buffer 122 up to the next estimated event or mispredicted branch, where the shadow array 112 would again wait for an indication as to whether the branch was correctly predicted or not (or whether the uop generated an event).

If a path failure occurs (e.g., a mispredicted branch or an event is detected) at or near where the RAT shadow array 112 is located, rather than stepping the primary array 110 back one uop at a time (which can be very time consuming), the RAT shadow array 112 can be flash copied (e.g., all array entries copied in one clock cycle) into the RAT primary array 110, thereby quickly moving the RAT primary array 110 back to the point (or state) at or near where the path failure occurred (e.g., back to the state near the mispredicted branch or to the uop that generated the event). If the path failure occurred near the location of the RAT shadow array 112, the RAT array can be moved or adjusted to the correct state if necessary before flash copying the RAT shadow array 112 into the RAT primary array 110.

Therefore, after the event occurs, the RAT shadow array 112 is adjusted to the correct state if necessary (e.g., the shadow is moved or adjusted if the shadow is not at the correct state when the event occurs). The "correct" state may be different in different implementations. According to an embodiment, the correct state could be, for example, the state up to and including the allocation of the mispredicted branch instruction or up to and including the instruction that caused the event.

Thus, the RAT primary array 110 can use the RAT copy in the shadow array 112 to recover the correct RAT state more quickly after a predicted path failure (e.g., recover from a mispredicted branch or event) if the shadow array 112 is located at or near the point of path failure.

According to one example of the invention, the RAT 108 attempts to keep the shadow array 112 located at (pointed to) the state of the best estimate of the next mispredicted branch or event. The RAT 108 may attempt to keep the shadow array 112 as close to the next mispredicted branch as possible (e.g., on or just before or just after the next branch). RAT 108 may use other algorithms or even heuristics or learning processes for locating the shadow array 112 in a position that allows the RAT the quickest or most efficient recovery from a predicted path failure. According to an embodiment, a branch predictor uses branch history information to provide a confidence level for each branch instruction that indicates the probability that a branch was correctly predicted. According to an embodiment, the RAT shadow array or arrays are preferably located at one or more branches where there is a relatively low probability that the branch was correctly predicted (i.e., located where an event is more likely to occur). When the processor determines that the branch was correctly predicted, the shadow array 112 then continues sequentially stepping ahead until it reaches the next branch (or the estimate of the next mispredicted branch or event).

Although techniques are described herein for the placement or movement of the shadow array 112 in order to allow a quick recovery by the RAT from a failure in the predicted path, other techniques or algorithms can be used as well. According to an embodiment, the shadow array 112 is very flexible and can be moved forward and backward to virtually any uop or state between uop allocation and uop retirement using the information in the history buffer 122. According to an embodiment of the invention, if the shadow array 112 moves on past a particular branch (or other uop), and that branch later mispredicts (or the uop generates an event), the shadow array 112 can be sequentially backed up one or more uops at a time until the shadow array reaches the mispredicted branch. When the shadow array 112 has been backed up to the point of the predicted path failure (e.g., to the mispredicted branch or to the uop that generated an event), the shadow array 112 is then flash copied to the primary array 110 to allow the primary array 110 to recover from the predicted path failure.

The fact that shadow array 112 can be moved backwards means that it is unnecessary to keep the shadow array 112 behind the point of uop retirement (or the point where it is confirmed that the branch instruction was correctly predicted). Without the ability to back up the shadow array, the shadow array would typically have to be located at or behind the point of retirement (or point of uop being confirmed that it executed properly without event), rather than moving ahead to the best estimate of the next point of predicted path failure (e.g., to the estimate of the next mispredicted branch). The location of the best estimate of the next predicted path failure may be much closer to the location of the primary array 110 than the retirement point. Thus, without the ability to back up the shadow array 112, the penalty for a mispredicted branch (or other predicted path failure) could be much greater. The flexibility of the shadow array 110 therefore can decrease the penalty associated with a mispredicted branch or other predicted path failure.

The shadow array 112 may be considered to be decoupled or independent from the primary array 110 because the shadow array 112 is not required to be located at a particular point of execution or retirement or at some other predetermined location or uop with respect to the state of the primary array. For example, it is not necessary for the shadow array 112 to maintain a predetermined distance (e.g., of at least 20 uops) between it and the primary array 110. Rather the shadow array 112 is flexible and can move freely between the point of allocation and the point of uop retirement without regard to the location or operation of the primary array. This, in part, is made possible by its ability to move backward as well as forward, using the information in the history buffer 122.

According to an embodiment of the invention, an architecture is provided in which there is only one array (the primary array 110) in which register mapping (logical to physical) or register renaming occurs. The shadow array 112 can be used to allow the RAT primary array 110 more quickly recover from a predicted path failure. However, according to an embodiment, there is preferably no data path output from the shadow array 112, and the shadow array 112 is preferably not used to actively map or rename registers. Rather, according to an embodiment, the shadow array 112 is moved to the best estimate of where the next mispredicted branch or other path failure will likely occur. If a predicted path failure occurs at or near that point, the shadow array 112 is adjusted to the correct state if necessary and is then copied into the primary array 110. However, the RAT preferably does not switch over to using the shadow array 112, as that would require additional or more complex circuitry to allow a switching or muxing between each array and additional data paths from the shadow arrays 112. In other words, the processor 100 preferably does not read Pdst information out of both the primary array 110 and the shadow array 112, but only reads out of the primary array 110. This is only one advantageous aspect of the invention, but is not required. Other embodiments are possible.

According to an embodiment, several (or multiple) shadow arrays can be employed to allow the RAT primary array 110 to recover from any of several possible path failures (e.g., mispredicted branches or events). For example, eight shadow arrays can be used, in which each shadow array 112 uses the information in the history buffer 122 to step forward (behind the primary array 110). When a first possible path failure is identified (e.g., the first branch uop), the first shadow array stops at or near that first branch. The remaining seven shadow arrays continue stepping forward until they reach a second point (e.g., a second branch uop) where a path failure is possible or likely, and the second shadow array stops at or near this uop. The remaining six shadow arrays 112 continue this process until each of the eight shadow arrays 112 (or at least some of them) have reached a different point of possible path failure (e.g., reached a different branch or other uop where an event can be generated). If one of the eight points or uops (e.g., branch instructions) creates a path failure (e.g., if an event is generated or a branch is mispredicted), the RAT shadow array 112 at (or corresponding to) the point of path failure is flash copied into the primary array 110, and into the other shadow arrays as well. The primary array 110 and all the shadow arrays would then continue moving forward in the same manner as described above from the point of failure (e.g., from the mispredicted branch) along a correct path. If the corresponding shadow array is not exactly on the point of failure (e.g., if the path fails between where two of the shadow arrays are located), the shadow array 112 that is closest to the point of path failure is selected. This selected shadow array closest to point of failure is then moved forward or backwards (as necessary) to reach the point of failure (i.e., moved to the state or point of the mispredicted branch), and then this adjusted shadow array 112 is then flash copied into the primary array 110 and the other shadow arrays.

EXAMPLES

Figure 5:
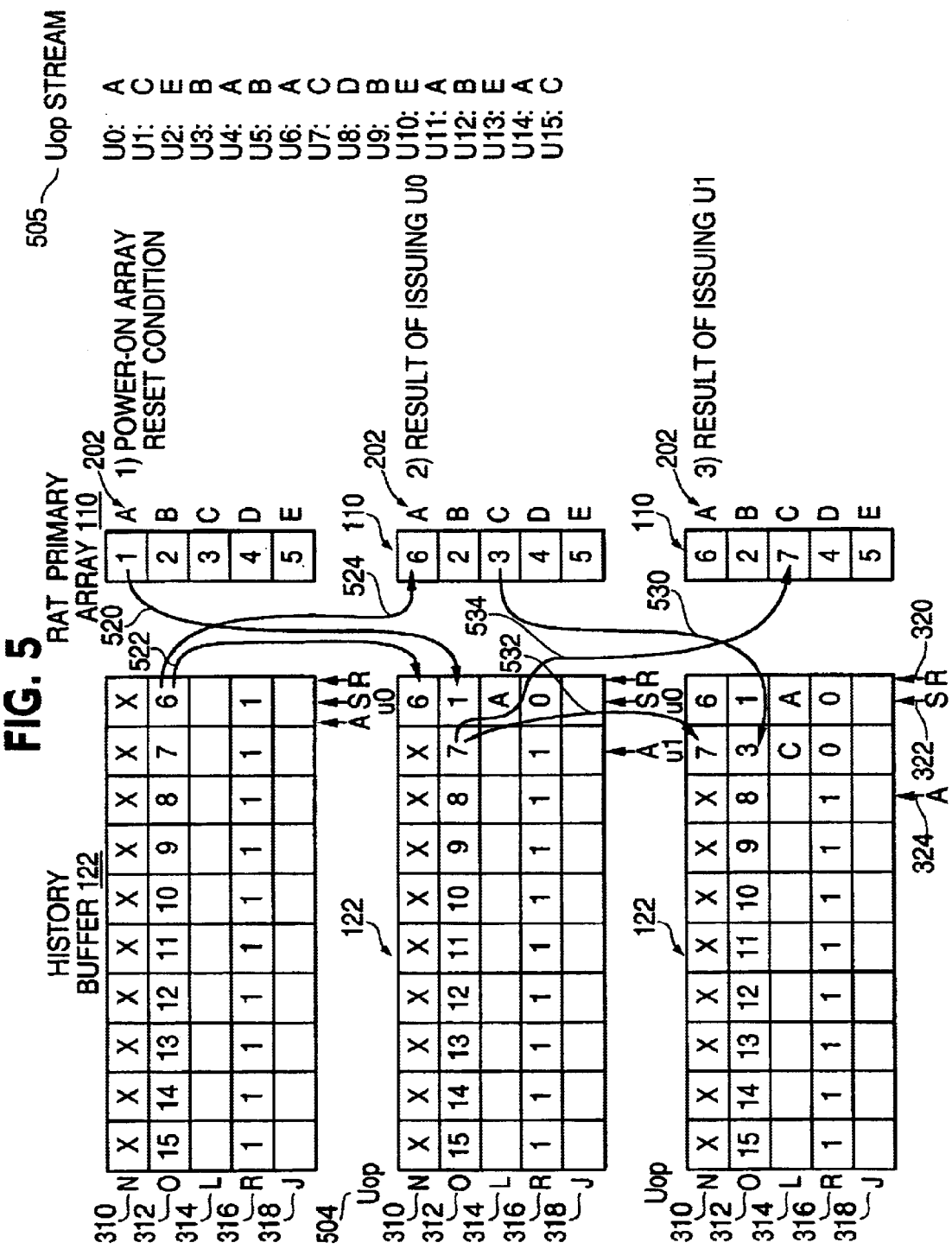
FIG. 5 is a diagram of a history buffer and a RAT primary array for three example steps.

Some aspects of the invention will be further explained with reference to the following examples. FIG. 5 is a diagram of a history buffer and a RAT primary array for three example steps. An example uop stream 505 (including the destination register for each write operation) is shown as an example for explaining aspects of the invention. There are five logical registers in the RAT primary array 110 (registers A–E) and there are ten columns or entries in the history buffer 122. Step 1 of FIG. 5 illustrates a power-on reset condition. According to an embodiment of the invention, in the power-on reset condition (step 1, FIG. 5), the first five physical register pointers (RF1–RF5) are loaded into primary array 110 for logical registers A–E, respectively, as shown in FIG. 5. Also, pointers to the remaining RF entries (RF6–RF15) are also loaded in numerical order in the history buffer as shown. The allocation pointer (A) 324, shadow pointer (S) 322 and retirement pointer (R) 320 initially point to the first (right-most) column or entry in the history buffer 122. The retire field 316 is set to 1 for all entries or columns in the history buffer to indicate that all the RF entries identfied in free/old field 312 are free (or unallocated). This list of RF entries in the free/old field 312 having R fields set to 1 is therefore considered a "free list."

Step 2 of FIG. 5 illustrates the result of issuing uop u0 (i.e., allocating and RF entry and updating primary array 110 and history buffer 122) according to an example embodiment of the present invention. As shown in the list of uops 505, uop u0 is a write to logical register A. At allocation time for uop u0, the allocator 120 allocates the next available RF entry as the Pdst for u0. In this case, the next available RF entry is RF6. After the RF entry (RF6) is selected for the uop u0, the RAT 108 reads out the old RF entry pointer (to RF1) in primary array 110 for register A, and stores this old RF entry pointer in the free/old field 312 of the first entry of history buffer 122, shown in FIG. 5 as line 520. The newly allocated RF pointer (pointer to RF6) is then stored in the new field 310 for this entry in the history buffer 122, shown as line 522. An A is written to the logical destination field 314 for uop u0 to indicate that logical register A is being renamed or mapped to physical register RF6. The retirement field 316 for u0 is cleared to a zero (0) and will remain cleared until uop u0 retires. The RAT primary array 110 is then updated to store the pointer to the new RF entry (RF6) allocated to register A, shown as line 524.

Also, in step 2, the allocation pointer (A) 324 is moved one entry to the left to indicate that new RF entry 6 (RF6) has been allocated as the new Pdst for register A. Also, the retire field (R) 316 is cleared to zero to indicate that this uop is not yet retired, and thus, both the old RF entry (RF1) and the new RF entry (RF6) are unavailable (allocated).

Therefore, it can be seen that at step 2, the history buffer 122 includes all the information (i.e., old RF entry, New RF entry, logical register) necessary to reverse or undo the logical to physical register mappings caused by issuing uop u0. The uop u0 is identified by field 504 in history buffer 122.

At some point in the future, when uop u0 is retired, ROB 130 (FIG. 1) will notify allocator 120 (FIG. 1) that u0 has been retired, and the retire field 316 will be set back to 1, which would indicate that the old RF entry (RF1) would again be free and available to be allocated to a new uop. Uops are retired in order. Thus, when uop u0 retires, any earlier uops that may have wanted the data in RF1 would have also retired. Thus, RF1 can be retired or made available or free when uop u0 retires. Uops after u0 (such as u1) will want the data in RF6 (or subsequent data) for register A, and thus, RF6 cannot yet be made available when u0 retires.

Step 3 of FIG. 5 illustrates the result of issuing uop u1 (allocating an RF pointer for u1, and updating the history buffer 122 and the primary array 110). Uop u1 is a write to logical register C. RF7 is allocated for U1. The old RF pointer (to RF3) is stored in the free/old field 312 of the second entry of the history buffer 122, line 530. The free RF pointer (in the old/free field 312 of step 2) that has been allocated to u1 (RF7) is stored in the new field 310 of the second entry of the history buffer 122, line 532. Finally, the RAT primary array 110 is then updated to store the pointer to the newest (and most speculative) RF entry or Pdst assigned to logical register C (pointer to RF7), shown as line 534. The allocation pointer (A) 324 is moved to the next (third) entry of buffer 122, and the retire field 316 for the second entry, uop u1, is cleared to zero to indicate that this uop (u1) is not yet retired.

Figure 6:
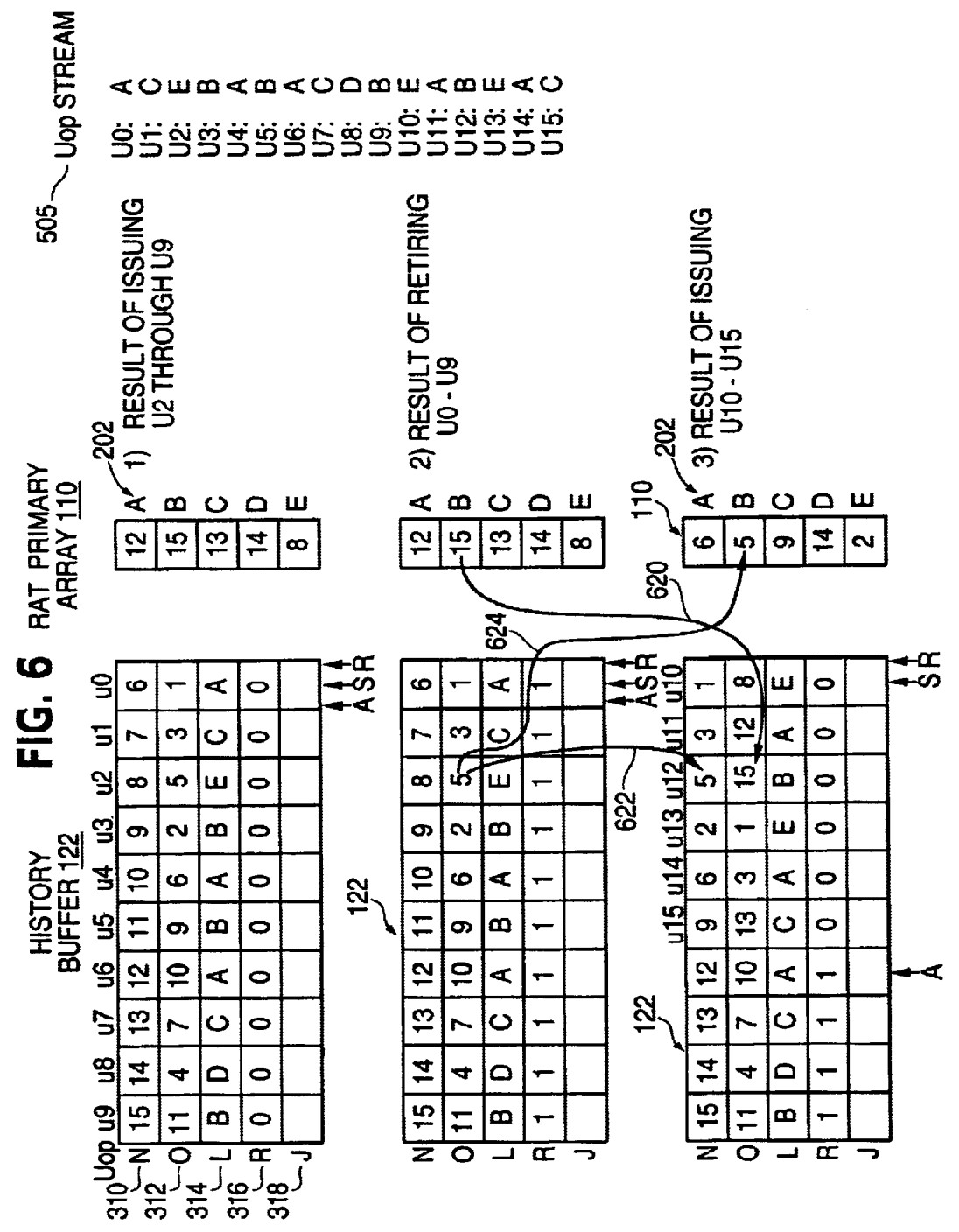

FIG. 6 is a diagram of a history buffer and a RAT primary array for three example steps according to an example embodiment of the present invention. Step 1 of FIG. 6 illustrates the results of issuing uops u2–u9. The history buffer 122 in step 1 of FIG. 6 stores a new RF pointer (field 310), an old RF pointer (field 312) and the corresponding logical register (field 314) for each of uops u0–u9. These reflect the logical to physical register mappings performed for each of uops u0–u9. For example, u4 results in the old RF entry (RF6) corresponding to register A to be replaced with the new RF entry (RF10). The RAT primary array 110 in step 1 also reflects the newest or most speculative state, after allocation of an RF entry for u9. Referring to the primary array 110 in step 1 of FIG. 6, RF12 mapped to register A resulted from uop u6, RF15 mapped to logical register B resulted from uop u9, RF13 mapped to register C resulted from uop u7, RF14 mapped to logical register D resulted from uop u8, and RF8 mapped to logical register E resulted from uop u2. Note that the allocation pointer 324 progressed from right to left (u0–u9) and then back u0. However, none of the uops u0–u9 have been retired (all 0s in the Retire field 316). Thus, the allocator 120 would at this point stall the RAT from allocating resources for any additional uops because no RF entries are available.

Step 2 of FIG. 6 illustrates the result of subsequently retiring uops u0–u9. Ones (1s) have been written to the retire field 316 for each uop, indicating that each of these uops is available again for allocation. Retirement does not alter the contents of the primary array 110.

Step 3 of FIG. 6 illustrates the results of subsequently issuing uops u10–u15. For example, RF5 is allocated to u12, which is a write to logical register B. Thus, for u12 in step 3, the old value in array 110 for register B (RF 15) is stored in the old/free field as the old value, line 620. The new allocated RF pointer (RF5) is then stored in the new field 310 for u12, line 622. The new allocated RF pointer (RF5) is then stored in the RAT primary array entry corresponding to logical register B, line 624.

FIG. 7 is a diagram of a history buffer, a RAT primary array and a RAT shadow array for three more example steps according to an example embodiment of the present invention. Step 1 of FIG. 7 continues from the end of step 3 of FIG. 6. In this example, it is assumed that uop u13 is a branch instruction. As a result, in step 1 of FIG. 7, the shadow array 112 advances from u10 to u14, which is the next uop after the branch uop (u13). Uops u10–u15 have been allocated. It can be seen that uops u10–u15 have been allocated because the retirement field 316 is cleared to zero for each of these uops. The RAT primary array 110 in step 1 of FIG. 7 also reflects the allocation up through u15 (e.g., logical register A being mapped to RF6, and register C being mapped to RF9). Because u13 is a branch uop, the uops after u13 (i.e., u14–u15) are part of a predicted path. Thus, the shadow array 112 contains (or reflects) the state of the logical registers up through the allocation for u13 (the branch uop). The shadow array 112, however, stops at u14 until the processor determines whether branch uop u13 was correctly predicted (thus, indicating whether uops u14 and u15 are correct or not). Thus, the shadow array 112 is pointed at (or near) the estimate of the next predicted path failure, u13 (since shadow array 112 in step reflects the state up through the allocation for uop u13, the branch instruction).

In step 1 of FIG. 7, in this example, it is assumed that branch uop u13 was mispredicted, as shown in FIG. 7, step 1. The branch uop u13 mispredicts (a mispredict is detected), and the shadow array 112 advances to the branch instruction, uop u13(these could occur in either order).

In step 2 of FIG. 7, since the state of the shadow array 112 reflects Pdst allocations only up through the mispredicted branch instruction (uop u13), the RAT primary array 110 can recover from the mispredicted branch in one clock cycle by flash copying the information in shadow array 112 to the primary array 110. Step 2 of FIG. 7 illustrates the primary array after flash copying the information from the shadow array 112 to the primary array 110. Thus, in step 2 of FIG. 7, the primary array 110 and the shadow array 112 are identical. However, according to an embodiment, to the fields and pointers in the history buffer 122 are not changed by the flash copy into the primary array 110.

In step 3 of FIG. 7, after the flash copy from the shadow array 112 into the primary array 110, the shadow pointer jumps up to the position of the allocation pointer 324. Allocator 120 allocates the next two RF entries, RF10 and RF7 (see new Field, N, 310 in history buffer 122) for uops u16 and u17, respectively, and allocation pointer A 324 steps forward two uops just past u17 (as shown in step 3 of FIG. 7). In addition, as compared to step 2 of FIG. 7, the retirement pointer (R) 320 continues to step forward, one uop at a time, as the ROB 130 notifies the allocator 120 that each of uops u10–u13 have been retired. Thus, the retire field (R) 316 is set to 1 in history buffer 122 for each of uops u10–u13 because these uops have been retired, while the retire field 316 for bad uops u14–u15 are cleared to zero because these bad uops will not be retired. The retirement pointer 320 moves forward up to u14 (uops u10–u13 have now been retired). Thus, at this point, the retirement pointer 320 points to u14. Once the shadow pointer (S) 322 and the retirement pointer (R) 320 have moved past the mispredicted branch u13 (i.e., once all uops up through the mispredicted branch have been retired), the retirement pointer (R) 320 may skip over any bad uops after the mispredicted branch (or other path failure) which were allocated before the mispredicted branch was detected. These bad uops (i.e., u14–u15) are part of a mispredicted path and will never be retired (and thus should be skipped and not retired). Preferably, however, the retirement pointer walks (one or more uops per clock cycle) through all the uops (both good and bad), but the processor indicates which uops are good (and should be retired) and which uops are bad (and should not be retired). The ROB 130 can issue a false retirement indication for those bad uops (e.g., u14–u15) after the mispredicted to branch (to indicate that their execution results should not be committed to architectural state). The processor can distinguish bad uops after the branch from good uops, for example, based on the jump color path field 318 (i.e., bad uops have a greater sequence number than the mispredicted branch and a jump color path that is the same as the mispredicted branch instruction u13). This is briefly explained below.

At the time the mispredicted branch was detected, resources had already been allocated for uops u14 and u15, which can be seen in step 2 of FIG. 7 because the allocation pointer 324 points just past uop u15. Thus, RF entries (i.e., RF6 and RF9, respectively) had already been allocated to u14 and u15 at the time the mispredicted branch was detected, as shown in step 1 of FIG. 7. As a result, u14 and u15 are allocated after the mispredicted branch (u13) and are part of a mispredicted path. Thus, uops u14 and u15 are bad (incorrect). Uops u14 and u15 are bad and will never be retired. Because a mispredicted branch was detected, the value in the jump color path 318 will be changed beginning where the allocation pointer (A) 324 was pointing when the mispredicted branch was detected. Thus, a new value (1) is used for the Jump color path field (J) 318 beginning for uops u16 and u17 to indicate that these uops are part of a different predicted path (in this case, a correct path). Thus, in history buffer 122, the jump color path field 318 is a zero (0) for u10–u15, and is a one (1) for uops u16 and u17. (The jump color path field 318 for columns after u17 are 1 because these columns are unallocated, and thus are old data, but will be set to 1 when allocated to uop u18, etc.). According to one example, the uops u10–u15 are part of a green path (ump color path field 318=0),while uops u16 and u17 are part of a blue path (jump color path field 318=1).

FIG. 8 is a diagram of a history buffer, a RAT primary array and a RAT shadow array for three additional example steps according to another example embodiment of the present invention. Step 1 of FIG. 8 continues from the end of step 3 of FIG. 6. At step 1 of FIG. 8, the shadow array 112 advances to uop u14, the branch uop u13 mispredicts, and the shadow array 112 is flash copied into the primary array 110. Thus, the primary array 110 and the shadow array in step 1 of FIG. 8 contain the same information.

At step 2 of FIG. 8, the allocation pointer (A) 324 progresses just past u17. In this example, the shadow pointer (S) 322 is advanced in sequence (one or more uops at a time) to the mispredicted branch u13, and then skipped over u14 and u15 (bad uops) to u16 based on the change in the jump color path field 318. The shadow pointer 322 then moves sequentially up to the allocation point (i.e., past u17). In addition, uop u10 retires and the retirement pointer (R) 320 moves to u11. The retirement of u11, however, generates an event (such as an interrupt), which causes the subsequent predicted path (including uops u12–u17) to fail. Even u13 is bad and should not have been executed. Thus, uops u12–u17 are now considered to be bad uops.

Step 3 of FIG. 8 will now be described. In response to detecting the event generated by uop u11 of step 2 of FIG. 8, the shadow pointer (S) 322 moves back sequentially (e.g., in order one or more uops per clock cycle) from the location of allocation pointer (A) 324 (column 805) back to the position of the retirement pointer (R) 320, which is at u11. The shadow pointer (S) 322 walks backwards sequentially through both the good uops and the bad uops. There is no problem with the shadow pointer (S) 322 moving backwards through bad uops (e.g., uops u14 and u15) because this merely restores the old values to the shadow array. Alternatively, the bad uops can be skipped.

Steps 2 and 3 together illustrate the process of moving the shadow array 112 backwards one uop to u17. The shadow pointer (S) 322 is moved backwards by copying the value (i.e, the RF pointer) in the old field 312 of each column which the shadow pointer (S) 322 traverses or passes into the appropriate logical register entry in the shadow array 112. For example, as shown in steps 2 and 3 of FIG. 8, to move the shadow pointer (S) 322 back one uop to u17, the pointer value (RF2) in the old field 312 of u17 is copied into the shadow array 112 (shown as line 812 in FIG. 8), at the location in array 112 corresponding to the logical register for u17, logical register E (shown as line 810, FIG. 8). The shadow pointer (S) 322 is accordingly shown as pointing to u17 in step 3. Thus, step 3 illustrates the history buffer 122, primary array 110 and shadow array 112 after the shadow array (S) 322 has moved backwards one uop to u17.

In a similar manner, the shadow pointer(S) 322 then continues moving backwards sequentially one or more uops at a time until the shadow pointer (S) 322 reaches the location of retirement pointer (R) 320 (pointing to u11), which is the uop that generated the event. The contents of the shadow array 112 are then flash copied into the primary array 110. The shadow pointer (S) 322 then jumps up to the location of the allocation pointer (A) 324. The allocator 120 then continues allocating RF entries for the next uop (i.e., u18), which is part of the correct path. The RF entry (column 805) will be allocated for uop u18, and a different value will be used in the jump color path field 318 for uops u18, u19, etc, because uops u18 and u19 are part of a new predicted path. The jump color path value for u18 can be a third value (e.g., the value 2), or can switch back to the value zero if jump color path 318 is a binary value.

According to an embodiment, uop u11 does not retire due to the event (i.e., u11 is a bad uop due to the event). Retirement pointer (R) 320 must be moved forward to u18, which is the next uop that will be retired (u11–u17 are bad uops). Because uops u11–u17 are bad uops, these uops will not be retired and their corresponding retire fields 316 will each remain a zero (0), indicating not retired. There are different ways to move the retirement pointer (R) 320 forward to u18. Uops u11–u17 are all bad uops, due to uop u11 which generated an event (at the time allocation pointer A was pointed at the uop or column 805 immediately after u17). Uop u17 was the last uop allocated when the event at u11 was detected. Therefore, uops u11–u17 are all bad or incorrect uops, and will not be retired.

According to one embodiment of the invention, the ROB 130 realizes that uop u11 is a bad uop and sends the allocator 120 a bogus or false retirement indication for uop u11, causing the retirement pointer 320 to move from u11 to u12.

The same is done to move the retirement pointer 320 from u12 to u13. The ROB 130 could issue false retirement indications for each uop between the event and the next branch instruction (e.g., issue false or bogus retirement indications for uops u11 and u12 in this example). Once the retirement pointer (R) 320 reaches this next branch instruction u13, the retirement pointer (R) 320 then skips over the uops with the jump color path field (0) that is the same as the branch (u13) to u16. Additional false retirement indications are then issued to move the retirement pointer (R) 320 to u18, which is the next correct instruction that will actually be correctly retired. According to another embodiment, the ROB 130 sequentially issues false retirement indications for each of u13–u17, moving the retirement pointer 320 to u18. According to yet another embodiment of the invention, a third distinct value (i.e., 2) can be used in the jump color path field for the new (correct) path of uops u18, u19, etc. This can be, for example, referred to as the purple path, and is associated with the present location of the allocation pointer 324. The retirement pointer (R) 320 would then jump ahead to where the allocation pointer (A) 324 is pointing (e.g., R jumps ahead until it reaches the value in the jump color path field associated with the position of the allocation pointer 324). Other techniques can be used to move the retirement pointer (R) 320 to the next uop to be retired (e.g., to uop u18). However, the retire field 316 for each of the incorrect uops will remain cleared or zero because these incorrect uops will not be validly retired (but these incorrect or bad uops may generate the bogus retirement indication to move the retirement pointer forward).

According to an embodiment of the invention, the retirement pointer 320 steps through all uops (both good and bad) after a mispredicted branch occurs, and the processor may use false retirement indications for those bad uops. However, if an event occurs that is not a mispredicted branch (e.g., trap, interrupt), the retirement pointer 320 may then jump up to the location of the allocation pointer 324 after a flash copy is performed from the shadow array 112 into the primary array 110.

In general, there may be two types of events: a trap and a fault. If an instruction causes a fault, the instruction will not be retired. However, if an instruction causes a trap, the instruction will be retired (and a 1 will be written to the retire field 316 for the instruction). Therefore, in the example of step 3 of FIG. 8 described above, the uop u11 generated a fault type of event because u11 was not retired (the processor issued a bogus retirement indication for u11).

A brief explanation will now be provided which describes one way in which RF entries are reallocated for new uops. The history buffer shown in FIG. 8 is ten entries wide and may be considered to be a circular buffer, as an example. The allocator 120 (FIG. 1) allocates RF entries for each new uop. According to an embodiment, the allocator 120 can allocate an entry from the oldest uop in the history buffer 122. For example, after uops u18 and u19 are allocated, uop u20 must be allocated from the RF entries listed in the new and old fields of the next column in the history buffer 122 (i.e., column for uop u10). The allocator 120 will select the new RF entry 310 or the old RF entry 312 from a column in the history buffer 122 to be allocated to the new uop, depending on the value of the corresponding retire field 316 of that column. If the retire field 316 is a 1, (indicating that this previous uop was validly retired), the old RF entry 312 is allocated to the new uop. This indicates that The old RF entry is reallocated when the previous uop is retired because uops are retired in order and there are no other uops which will need this old data (data in the old RF entry). Newer uops may still need the new data (data in the new RF entry). On the other hand, if the retire field is a 0 (indicating that the uop was never retired), the allocator will reallocate the new RF entry 310 in the column of the history buffer 122. This is because the new RF entry contains bad or incorrect data which will not be needed by any uops (and thus can be reallocated), while the old RF entry contains the correct data which may be needed by other uops.

As an example, if RF entries have been allocated for uops u10–u19. The allocator 120 is now ready to allocate an RF entry for uop u20, and the allocator 120 will select one RF entry from the column corresponding to previous uop u10. The retire field 316 is a 1 for uop u10 as shown at the bottom of FIG. 8. This indicates that uop u10 was retired, and the old RF entry (RF8 in this example) will be allocated for uop u20. For uop u21, it can be seen that the next column corresponds to u11. The retire field 316 for u11 is a zero which indicates that u11 was not retired. Thus, the new RF entry (RF3) from u11 at the bottom of FIG. 8 will be allocated to u21.

The particular register allocation/deallocation techniques described herein are demonstrative. Neither these nor any other specific register allocation/deallocation techniques may be required for the present invention. Alternative known or otherwise available register allocation and/or deallocation techniques may be used.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, while the present invention has been described with reference to the above-described history buffer, a wide variety of techniques or buffer formats can be used to keep track of the historical allocation of physical registers for each uop.

What is claimed is:

1. An apparatus for allowing a processor to recover from a failure of a predicted path of instructions comprising:
    a plurality of physical registers to store architectural data and speculative data, each physical register to store one of architectural data and speculative data;
    a primary array to store a speculative state of the processor including mappings from logical registers to physical registers;
    a history buffer coupled to the primary array to store information identifying physical registers in a mapped sequence; and
    a retirement pointer associated with the buffer, the retirement pointer to identify which physical registers in the mapped sequence store architectural data.

2. The apparatus of claim 1, further comprising logic to change the retirement pointer when one of the physical registers stores architectural data.

3. The apparatus of claim 1, wherein the information stored within the buffer comprises a bit to identify whether a respective physical register stores architectural data.

4. The apparatus of claim 1, wherein the buffer allows recovery from a mispredicted event.

5. The apparatus of claim 1, wherein the buffer comprises an array having a free/old field and a retire field, the free/old field to identify available physical registers and previous physical registers based on corresponding information in the retire field.

6. The apparatus of claim 1, wherein the retirement pointer identifies the next physical address to be allocated.

7. A method of allocating registers in a speculative processor comprising the steps of:
    receiving an instruction specifying a logical register for storing an execution result;
    allocating a physical register for storing the instruction, said physical register being one of a plurality of registers to store architectural data and speculative data, each physical register to store one of architectural data and speculative data;
    storing in a history buffer information identifying physical registers in an allocated sequence; and
    moving a retirement pointer associated with the history buffer to identify whether an execution result stored in the physical register in the allocated sequence is architectural data.

8. An apparatus for allowing a processor to recover from a failure of a predicted path of instructions comprising:
    a plurality of physical registers to store architectural data and speculative data, each physical register to store one of architectural data and speculative data;
    a primary array storing a mapping from logical registers to physical registers, the primary array storing a current speculative state of the processor;
    an allocator allocating an available physical register as the physical destination for storing the execution results of an instruction, the allocated physical register corresponding to a logical register;
    a history buffer coupled to the secondary array and storing information related to historical remapping of logical registers from previous physical registers to current physical registers;
    a secondary array coupled to the primary array and the history buffer, the secondary array storing a secondary speculative state of the processor including a mapping from logical registers to physical registers, the secondary array being movable to any instruction between the point of physical register allocation and retirement based on the history buffer, the secondary array being movable to any location or instruction independent of which instructions have been executed;
    wherein the secondary array can be copied to the primary array to allow the processor to recover from the failure in the predicted path.

9. The apparatus of claim 8, further comprising a retirement pointer associated with the history buffer to identify which physical registers store architectural data.

10. The apparatus of claim 8 wherein said secondary array is moved to an estimated location of a next failure in the predicted path, the secondary array being adjusted to a correct state if necessary and then copied into the primary array if a path failure occurs to allow the primary array recover from the path failure to the correct state.

11. The apparatus of claim 8 wherein the processor attempts to maintain the secondary array at an estimate of the next mispredicted branch instruction or other instruction which may generate an event that would result in a failure of the subsequent path.

12. The apparatus of claim 8 wherein the secondary array comprises a plurality of secondary arrays, at least some of the secondary arrays being located at different locations, one of the secondary arrays being selected and copied into the primary array if predicted path failure occurs to restore the primary array to a correct state.

13. The apparatus of claim 11 wherein each of the secondary arrays is located at a different location in the history buffer.

14. The apparatus of claim 8 wherein the history buffer includes path information that allows the processor to distinguish between: a) register mappings for any instructions after a path failure which are part of failed or incorrect path which should not be executed, and b) register mappings for instructions after a path failure which are part of a correct path.

15. The apparatus of claim 8 wherein the history buffer includes a list of free or available physical registers.

16. The apparatus of claim 8 wherein the history buffer comprises one or more pointers to the history buffer, including:
- an allocation pointer identifying the next available physical register to be allocated for the next instruction;
- a retirement pointer identifying the entry in the history buffer corresponding to the next instruction to be retired; and
- a secondary pointer identifying the current location or state of the secondary array.

17. The apparatus of claim 8 wherein the secondary array comprises a plurality of secondary arrays, each secondary array storing a secondary speculative state of the processor including a mapping from logical registers to physical registers, each of the secondary arrays being movable to any instruction between the point of physical register allocation and retirement based on the history buffer, each of the secondary arrays being movable to any location or instruction independent of which instructions have been executed;
wherein one of the secondary arrays can be copied to the primary array to allow the processor to recover from the failure in the predicted path.

18. The apparatus of claim 17 wherein each of the secondary arrays storing a speculative state at an estimate of where a path failure is likely to occur, the apparatus using branch prediction logic to identify estimates where the path failures are likely to occur.

19. An apparatus for allowing a processor to recover from a failure of a predicted path of instructions comprising:
- a plurality of physical registers to store architectural data and speculative data, each physical register to store one of architectural data and speculative data;
- a primary array storing a first speculative state of the processor including a mapping from logical registers to physical registers,
- a secondary array coupled to the primary array, the secondary array storing a second speculative state including a mapping from logical registers to physical registers, the second speculative state of the processor being previous to the primary speculative state of the processor; and
- a history buffer coupled to the secondary array and storing information related to historical remapping of logical registers from previous physical registers to current physical registers.

20. The apparatus of claim 19 wherein the secondary array being movable to a particular speculative state based on the mappings stored in the history buffer, wherein the secondary array can be copied to the primary array when a failure is detected in a predicted path of instructions to allow the processor to recover from the failure in the predicted path.

21. The apparatus of claim 19 wherein the history buffer identifies the following information for each instruction:
- a logical register that is the logical destination for the execution results of the instruction;
- a new physical register selected from available physical registers and that is allocated as the physical destination for the execution results of the instruction, the new physical register being mapped to the logical register; and
- an old physical register previously mapped to the logical register.

22. The apparatus of claim 21 wherein the predicted path failure comprises at least one of the following:
- a mispredicted branch instruction;
- an instruction that generated a fault; and
- an instruction that generated a trap.

23. The apparatus of claim 19 wherein the primary array includes a pointer to a physical register for each logical register.

24. The apparatus of claim 19 wherein the secondary array includes a pointer to a physical register for each logical register.

25. The apparatus of claim 19, further comprising a retirement pointer associated with the history buffer to identify which physical registers store architectural data.

26. An apparatus comprising:
- a plurality of registers to store architecturally committed data and speculative data, each one of said plurality of registers to store one of architecturally committed data and speculative data;
- logic to store a plurality of states including a speculative state and at least one shadow state, each of said plurality of states including mappings from logical registers to physical registers in said plurality of registers;
- a history buffer storing information identifying physical registers in a mapped sequence and information related to historical remapping of logical registers from previous physical registers to current physical registers; and
- logic to change a retirement pointer associated with the history buffer, the retirement pointer to identify which physical pointers in the mapped sequence store architecturally committed data.

27. The apparatus of claim 26 and further comprising:
logic to advance a plurality of pointers, one of said plurality of pointers being an allocation pointer that indicates a primary state that is advanced by speculatively executed instructions, one of said plurality of pointers being a shadow pointer that indicates a shadow state having a lesser degree of speculation than said primary state.

28. The apparatus of claim 27 and further comprising:
speculation recovery logic to copy said shadow state to said primary state to undo at least a portion of completed speculative execution.

29. The apparatus of claim 27 wherein said logic to advance said plurality of pointers is capable independently advancing each of said plurality of pointers.

30. The apparatus of claim 28 wherein said at least one shadow state comprises a plurality of shadow states, each of said plurality of shadow states reflecting a different degree of speculation that is lesser than said primary state, and wherein said speculation recovery logic is capable of copying any of said plurality of shadow states to said primary state to undo speculative execution.

31. The apparatus of claim 26 wherein said logic to store a plurality of states comprises:
- a primary array to store said speculative state;
- a secondary array to store said shadow state; and
- logic to update said primary array upon retirement of an instruction.

32. The apparatus of claim 31 wherein the logic to update said primary array comprises a history buffer coupled to the secondary array, said history buffer to store historical physical register to logical register mappings performed for each of a plurality of instructions of a predicted path.

33. The apparatus of claim 26, wherein the logic changes the retirement pointer when one of the physical registers stores architecturally committed data.

34. The apparatus of claim 26, further comprising a history buffer associated with the retirement pointer, the retirement pointer to identify a specific entry in the history buffer.

35. The apparatus of claim 34, wherein the information stored within the buffer comprises a bit to identify whether a respective physical register stores architectural data.

36. The apparatus of claim 34, wherein the history buffer allows recovery from a mispredicted event.

37. The apparatus of claim 34, wherein the history buffer comprises an array having a free/old field and a retire field, the free/old field to identify available physical registers and previous physical registers based on corresponding information in the retire field.

38. The apparatus of claim 34, wherein the retirement pointer identifies the next physical address to be allocated.

39. An apparatus comprising:
   a plurality of physical registers to store architecturally committed data and speculative data, each one of said plurality of registers to store one of architecturally committed data and speculative data;
   a primary array to store a speculative state of a processor including a mapping from logical registers to physical registers;
   a history buffer to store information related to historical remapping of logical registers from previous physical registers to current physical registers in a mapped sequence; and
   a pointer controlled by logic so as to identify a location within the history buffer, the location to identify which physical registers in the mapped sequence store architectural data.

40. The apparatus of claim 39, further comprising logic to change the retirement pointer when one of the physical registers stores architectural data.

41. The apparatus of claim 39, wherein the information stored within the history buffer comprises a bit to identify whether a respective physical register stores architectural data.

42. The apparatus of claim 39, wherein the history buffer allows recovery from a mispredicted event.

43. The apparatus of claim 39, wherein the history buffer comprises an array having a free/old field and a retire field, the free/old field to identify available physical registers and previous physical registers based on corresponding information in the retire field.

44. The apparatus of claim 39, wherein the retirement pointer identifies the next physical address to be allocated.

* * * * *

UNITED STATES PATENT AND TRADEMARK OFFICE
CERTIFICATE OF CORRECTION

PATENT NO. : 6,633,970 B1
DATED : October 14, 2003
INVENTOR(S) : David W. Clift et al.

It is certified that error appears in the above-identified patent and that said Letters Patent is hereby corrected as shown below:

<u>Column 22,</u>
Line 52, "primary array" should be -- primary array to --.

Signed and Sealed this

Seventh Day of March, 2006

JON W. DUDAS
*Director of the United States Patent and Trademark Office*